United States Patent
Pitchon et al.

[15] 3,655,399
[45] Apr. 11, 1972

[54] INSTANT COFFEE AND PROCESS FOR MAKING SAME

[72] Inventors: Esra Pitchon, Flushing; Ernest L. Earle, Jr., New City, both of N.Y.

[73] Assignee: General Foods Corporation, White Plains, N.Y.

[22] Filed: Mar. 26, 1969

[21] Appl. No.: 810,810

[52] U.S. Cl. ..............................................99/71
[51] Int. Cl. ............................................A23f 1/08
[58] Field of Search......................................99/71

[56] References Cited

UNITED STATES PATENTS

| | | |
|---|---|---|
| 3,035,922 | 5/1962 | Mook et al................................99/71 |
| 3,089,772 | 5/1963 | Bowden et al. ..........................99/71 |
| 3,092,498 | 6/1963 | White et al. .............................99/71 |
| 3,224,879 | 12/1965 | Di Nardo..................................99/71 |
| 3,244,533 | 4/1966 | Clinton et al. ..........................99/71 |
| 3,361,572 | 1/1968 | Nutting et al............................99/71 |
| 3,458,320 | 7/1969 | Niven, Jr. ................................99/71 |
| 3,035,921 | 5/1962 | Carver et al.............................99/71 |

OTHER PUBLICATIONS

Sivetz & Foote, Coffee Processing Technology, Vol. 1, p. 239, (1963).

*Primary Examiner*—Frank W. Lutter
*Assistant Examiner*—William L. Mentlik
*Attorney*—Bruno P. Struzzi, Thomas V. Sullivan and Gerald E. Jacobs

[57] ABSTRACT

An improved instant coffee having a flavor which is more like that of home brewed coffee is prepared by a unique new process. A portion of the roasted coffee is treated prior to percolation to remove desirable flavor notes. The partially extracted coffee is then combined with the remainder of the roasted coffee and subjected to a standard percolation operation. The liquor containing the flavor notes is added back into the system at the fresh stage in percolation or is combined with the final extract from the percolators.

11 Claims, No Drawings

3,655,399

INSTANT COFFEE AND PROCESS FOR MAKING SAME

BACKGROUND OF THE INVENTION

This invention concerns the production of an improved instant coffee by a new and unique process. More particularly, it pertains to a method of preserving key flavor notes extracted from a portion of the processed coffee as a means of enhancing the flavor of an instant coffee.

Attempts to make an instant coffee which will match a fresh brewed cup of coffee as to aroma, taste and appearance have been numerous and varied. These different approaches can be broken down into two major categories. In the first category attempts have been made to incorporate varying fractions of roasted and ground coffee into an instant coffee product. The grind size of the regular coffee has ranged from that simulating size of the instant coffee particles down to particles which are colloidal in size. These attempts have met with a varying degree of success but have generally failed, either because the added roasted and ground particles detracted significantly from the appearance of the prepared beverage or because the process was too involved and costly.

The second category of attempted flavor improvements has developed along the lines of separating out from the coffee a flavor component which can be added back to the instant product, either before or after the final drying step. Included in this category would be such things as the extraction of coffee oil prior to percolation and the stripping of aromatics from the whole roasted coffee or the roasted and ground coffee by vacuum or steam distillations. Generally these aromatic constituents have proven undesirable because they were unstable or because uniformity was difficult to achieve. Those that are used commercially today do improve the flavor of instant coffee, however, they have not resulted in an instant product with a flavor that truly matches that of a fresh brewed cup of coffee.

SUMMARY

It has now been discovered that an instant coffee can be prepared with an aroma and flavor which closely simulates that of fresh brewed coffee. The improved product of this invention is prepared by separately treating up to 50 percent of the roasted and ground coffee prior to the normal percolation step. This pretreatment is in essence a partial extraction of the flavor notes most strongly identifiable in fresh brewed coffee. The liquid containing these flavor notes is separated from the partially extracted coffee and this partially extracted coffee is then combined with the remainder of the roasted and ground coffee and subjected to a normal, commercial percolation operation. The liquor containing the flavor notes can be added back either at the fresh stage in the percolation operation or it may be combined with the final extract from the percolators.

The final extract containing the flavor fraction is then dried to produce the instant coffee. A preferred method of drying is vacuum freeze drying as this insures the preservation of the desirable flavor of the product of this invention.

The process of this invention has the advantage of producing a consistent and desirable product in a manner which can be readily adapted to existing commercial processes for the manufacture of instant coffees.

DESCRIPTION OF THE PREFERRED EMBODIMENT

A typical process for the manufacturer of an instant coffee would comprise the following steps: 1) cleaning and blending of green coffee beans; 2) roasting of the blended green coffee; 3) grinding the roasted coffee; 4) extracting solids from the roasted and ground coffee (This step is commonly referred to as percolation, and the solution of coffee solids in water which is prepared is referred to as coffee extract.); 5) Spray drying the coffee extract to obtain dry coffee solids at a moisture content of about 1–3 percent. Other processes may include such variations as roasting of separate coffee varieties and blending after roasting, aroma distillation or oil extraction, and vacuum freeze drying of the coffee extract. The process of this invention can be used with the standard coffee process or any of the variations commonly practiced today.

The key step in the process of this invention occurs after the roasted coffee has been prepared, and prior to percolation. A fraction of the roasted coffee is ground and mixed with water. The resultant slurry is agitated for from 1 to 40 minutes while maintaining a temperature of about 70° to 200° F. The slurry is then separated into two fractions by any appropriate method such as decantation or centrifugation. One fraction, the wet, partially extracted grounds are blended with the untreated fraction of R&G and subjected to percolation. The second fraction, a dilute extract, contains the desired flavor which is to be preserved by the process of this invention. This flavor bearing fraction is subsequently combined with percolator extract and dried to obtain the improved instant coffee of this invention.

The fraction of roasted and ground coffee which is subjected to the slurry operation can be obtained after all of the coffee has been roasted and ground or by separating the roasted whole beans into fractions and grinding the fractions separately. Alternatively, a special blend of green coffee beans can be roasted and subjected to the slurry operation and the slurry then treated as described in the preceding paragraph. The grind size of the coffee subjected to the slurry operation may be varied over wide ranges. Thus, a coarse grind commonly associated with percolation in a battery of columns may be used. Alternatively, grinding may be controlled to yield ultra fine particles essentially colloidal in size, e.g. particle size of less than 150 microns. Any grind size between the coarse and colloidal range may be used and typically the grind used will most conveniently correspond to the grind size used in percolation.

Time and temperature in the slurry operation will depend to a large extent on the grind size of the coffee being treated. Thus, if a coarse grind is being used, agitation of the slurry will be continued from about 5 to 40 minutes, preferably for 10 to 20 minutes at temperatures of about 140° to 200°. If a colloidal grind is being used, agitation of the slurry will be continued for only 1 to 10 minutes, preferably at temperatures of about 100° to 180° F. Indeed, if the colloidal particles are prepared via a wet grinding technique, agitation may be eliminated entirely, the exposure of the colloidal particles to the water during grinding being sufficient to remove the desired flavor fraction.

Typically the percolators will consist of a battery of columns through which water is circulated. The fresh water is fed to the column containing the most extracted roasted and ground coffee (hereinafter referred to as R&G) and then passes from column to column until it reaches the column containing the fresh loaded R&G coffee. The water picks up solids in each successive column becoming a more and more concentrated extract. After passing through the freshly loaded column, the extract drawn off from this column is then dried to produce the instant coffee. Completely extracted coffee is discharged from a column after the flow of feed water has been diverted to the next most spent column of R&G and the empty column is loaded with fresh R&G coffee and becomes the fresh stage for the next batch of extract to be drawn off. In this manner a countercurrent flow of R&G and water is achieved. The columns are commonly referred to as stages and as indicated the fresh stage is the column containing the fresh, unextracted R&G.

As indicated, they key step in the process of this invention is the discovery that the solution which is separated from that portion of the R&G that had been previously treated as a slurry contains desirable flavor characteristics not obtainable by standard percolation techniques which can be preserved even after it is combined with the extract drawn-off from the percolators. This first separation can be by decantation, filtration or centrifugation. It has been found that the solution containing the flavor constituents normally will also contain undesirable insoluble material and excessive amounts of coffee oil which, if retained in the final product, will detract from the appearance of a cup of coffee prepared from the dry instant coffee. Therefore, it has been found that a second separation step to remove insoluble solids and oils from this solution is essential. It is desirable to reduce the oil level in the final extract to less than 1 percent of the solids content. A preferred method for effecting this separation is centrifugation. The centrifuged solution can then be combined with the extract from the percolators and further processed.

Alternatively, it has been found that the second separation can be accomplished by blending the dilute extract containing the flavor constituents with the extract stream in the percolators before it is passed through the fresh stage of the percolation operation. Apparently, since the temperature in the fresh stage is normally controlled at less than about 200° F., the flavor constituents are not harmed. Also, the R&G coffee in the fresh stage filters the undesirable insoluble material and oils from the flavor laden extract. Therefore, addition of the extract containing the flavor constituents prior to the fresh stage of the percolators is a preferred embodiment of this invention as it eliminates the additional step of centrifugation previously described. In carrying out this mixing of extracts it is preferred to actually pump the dilute extract into the fresh stage first, followed by the extract from the previous stage. In this manner, the flavor laden dilute extract is more completely pushed out of the fresh stage column than if the extract streams were physically mixed prior to entering the fresh stage.

As an alternate to adding the grounds which have been slurry extracted to the percolators for final autoclave extraction, these grounds can be separately subject to additional extraction step, e.g. in an autoclave. The autoclave liquor can then be blended with the dilute extract and the extract from the percolators and the final blend of extracts can be dried to yield a flavor enhanced soluble coffee.

Also, it has been found that the slurry can be blended with the previously unextracted roasted and ground coffee with no intermediate separation, and the mixture of slurry and ground unextracted coffee can be used as the feed material to be loaded into the fresh stage of the percolators. In this manner, both the first and second separations which the slurry extract was previously subjected to are eliminated and the insoluble material and oils are removed solely by the filtration effect obtained in the percolator column.

As previously indicated, the fraction of roasted coffee being separately treated may be ground to a colloidal state wherein all of the coffee particles will have a final size of less than 150 microns. The colloidal particles may be prepared in a standard colloid mill. It has been found that a slurry operation of from 1 to 10 minutes is sufficient when using colloidal particles as extraction of the flavor constituents is very rapid. This slurry of fine grind R&G and water is then subjected to a physical separation as was the slurry of coarse ground R&G. However, in this instance it is desirable to use centrifugation in order to effectively separate the fine ground R&G from the extract containing the flavor constituents. The R&G residue and the solution of flavor containing materials are then treated in the same manner as the products obtained when using a slurry of coarse R&G. If the solution of flavor constituents is to be combined with the extract after percolation is completed, it should be subjected to a second centrifugation operation in order to remove the bulk of any insoluble material which may be present in a colloidal or semi-colloidal state.

It has also been found, that the roasted coffee can be wet ground to obtain the colloidal particles. When wet grinding, the quantity of water used is about 2 to 10 times the weight of coffee being ground. The wet ground particles and water may then be maintained at from 65° to 200° F. for about 1 to 10 minutes prior to centrifugation. A preferred temperature range is 65° to 100° F.

The final extract consisting of the percolation extract and the extract from the slurry operation is dried to obtain a final soluble coffee product wherein the particles of coffee have a moisture content of less than 3%. The preferred method of drying is vacuum freeze drying as this is a known technique for the preservation of flavor constituents. Any of the standard vacuum freeze drying processes may be used. The product produced by the process of this invention is found to have a superior flavor which closely resembles that of fresh brewed coffee.

The process of this invention will be further understood by reference to the following examples.

EXAMPLE I

An instant coffee containing a flavor closely resembling that of fresh brewed coffee was prepared as follows:

Roasted coffee beans were coarse ground in a standard grinder to obtain a grind suitable for use in a percolation system consisting of a battery of six columns. 100 percent of the ground coffee passed through a U.S. No. 4 screen and 95 percent of the particles were retained on a U.S. NO. 20 screen. All the particles which passed through a U.S. No. 40 screen were separated out, formed into pellets and subsequently added to the percolator column with the R&G coffee.

The percolator columns were designed such that each column would hold a charge of 100 lbs. or R&G. Percolation was performed by the method well known in the art wherein the coffee and water simulated a countercurrent flow and extract was drawn off from the system in cycles.

100 lbs. of R&G coffee was separated into two fractions. Fraction A having 25 lbs. and fraction B 75 lbs.

Fraction A was mixed with 100 lbs. of water at a temperature of 180° F. and the resultant slurry was gently agitated for 20 minutes. The slurry was then separated by decantation into two fractions. The liquid fraction weighed 50 lbs. and contained 2.5 lbs. of dissolved coffee solids. The wet ground fraction was then blended with the 75 lbs. of R&G from fraction B and this combination of wet partially extracted R&G, and fresh R&G was used to load a percolator column.

Temperatures and pressures in the percolation operation were adjusted such that a cycle of extract weighed 210 lbs. and contained 32.5 lbs. of dissolved solids. The liquid stream from the slurry operation was then centrifuged to remove any insoluble material and mixed with the cycle of extract resulting in a final batch of extract weighing 260 lbs. and containing 35 lbs. of dissolved solids.

The extract was spray dried by a technique well known to those skilled in the art and a dry instant coffee at a moisture content of 2.5 percent was attained.

The resultant product had a flavor which was judged to be significantly different than an instant coffee prepared without having separately treated a portion of the R&G coffee. The product as prepared in this example was found to have a flavor more closely resembling fresh brewed coffee than standard instant coffees.

EXAMPLE II

A batch of extract was prepared as in Example I. The extract was frozen to below its eutectic point and the frozen extract was freeze dried to a moisture content of 2.5 percent.

The freeze dried coffee was significantly better than its spray dried counterpart prepared in Example I and was found to have a flavor closely resembling that of fresh brewed coffee.

EXAMPLE III

R&G coffee was separated into two fractions as in Example I. Fraction A containing 25 lbs. was formed into a slurry with water and subsequently separated into two fractions as in Example I. The wet grounds fraction was treated in the identical manner as Example I.

The liquid extract stream obtained from the slurry was combined with the extract stream passing through the percolator columns prior to the fresh stage. Temperatures and pressures in the percolation operation were controlled such that a cycle of extract weighed 260 lbs. and contained 35 lbs. of dissolved solids. The extract when prepared in this manner was really a combination of the normal percolation extract and the separately prepared liquid fraction obtained from the slurry operation.

The extract was frozen and freeze dried to a moisture content of 2.5 percent. The resultant product had a flavor which was almost identical to the product prepared in Example II and closely resembled the flavor of fresh brewed coffee.

EXAMPLE IV

A batch of 100 lbs. of whole roasted coffee beans was separated into two fractions. Fraction B containing 75 lbs. was ground as in Example I. Fraction A containing 25 lbs. was ground in a corundum disk colloid mill such that all of the particles were less than 150 microns in size. The fine ground particles were then mixed with 75 lbs. of water at 160° F. and vigorously agitated for 2 minutes. The thus formed slurry was then separated by centrifugation into two fractions. The wet grounds fraction was combined with the ground particles from fraction B and subjected to a standard percolation operation. The liquid fraction from the slurry was subjected to a second centrifugation operation and then combined with the extract from a percolator cycle.

The combined batch of extract weighed 235 lbs. and contained 35 lbs. of dissolved solids. This extract was frozen and freeze dried to a moisture content of 2.5 percent.

The resultant product had a flavor which closely resembled that of fresh brewed coffee.

EXAMPLE V

Two fractions of whole roasted coffee beans were prepared as in Example IV. Fraction A containing 25 lbs. of beans was mixed with 100 lbs. of water and wet ground in a corundum disk colloid mill such that all of the ground particles were less than 150 microns in size. The resultant slurry was then separated into two fractions as in Example IV.

The wet ground fraction of the slurry was blended with the ground particles of fraction B and subjected to percolation. The liquid fraction from the slurry was then combined with the percolator extract stream prior to the fresh stage of percolation. A batch of extract weighing 260 lbs. and containing 35 lbs. of dissolved solids was drawn off. The extract was frozen and freeze dried to a moisture content of 2.5 percent.

The resultant product had a desirable flavor which closely resembled that of fresh brewed coffee.

The forgoing examples were for illustrative purposes and it is obvious that other readily apparent combinations of process steps are within the scope of this invention. Therefore, the invention is intended to be limited only by the appended claims.

What is claimed is:

1. A method for the manufacture of an improved instant coffee comprising:
   percolating coffee in a battery of columns by contacting the most extracted roasted and ground coffee in the battery with water to form a coffee extract which is withdrawn after extracting the freshest roasted and ground coffee in the fresh stage of the battery;
   providing fractions A and B of roasted and ground coffee, fraction A being less than 50 percent of the total ground coffee of fractions A and B;
   forming a slurry of water and the coffee of fraction A, the temperature of said slurry being maintained at from 70° to 200° F. for from 1 to 40 minutes to produce a slurry comprising a liquid fraction containing desirable flavor constituents and a wet grinds fraction;
   contacting fraction A and fraction B in the fresh stage of said battery of percolation columns, percolating fraction A and fraction B such that the roasted and ground coffee in the fresh stage is effective to filter and remove undesirable insoluble materials and oil from the liquid fraction containing desirable flavor constituents and produce a flavor-laden extract;
   collecting the flavor-laden coffee extract leaving the fresh stage of the percolation battery;
   and drying the extract to obtain an instant coffee having a moisture content of less than about 3 percent.

2. The method of claim 1 which the oil level in the extract collected from the fresh stage is less than 1 percent of the solids content of the extract.

3. The method of claim 1 which further includes separating the slurry of water and coffee of fraction A into a wet grinds fraction and a liquid fraction containing desirable flavor constituents;
   blending the wet grinds fraction with fraction B in the fresh stage;
   combining the liquid fraction obtained from the slurry with coffee extract as it is fed into the fresh stage where contact with the roasted and ground coffee is effective to filter and remove undesirable insoluble materials and oil.

4. The method of claim 3 wherein the liquid fraction obtained from the slurry is clarified and partially deoiled by centrifugation prior to being added to the coffee extract.

5. The method of claim 3 wherein the extract is freeze dried.

6. The method of claim 3 wherein 100 percent of the particles of fraction A are retained on a U.S. No. 80 screen, and wherein the slurry is maintained at from 140° to 200° F. for from 5 to 40 minutes and wherein the extract is freeze dried.

7. The method of claim 1 in which
   fraction B is ground to particles suitable for percolation;
   fraction A is ground to particles having a particle size less than 150 microns;
   the slurry is maintained at a temperature of 70° to 200° F. for from 1 to 10 minutes and extract from the fresh stage is collected having an oil content of less than 1 percent of the solids content of the extract.

8. The method of claim 7 wherein the slurry is separated into a wet grinds fraction and a liquid fraction containing desirable flavor constituents and the liquid fraction is added to the extract in the percolators as it is fed to the fresh stage of the percolation operation.

9. The method of claim 8 wherein the extract is freeze dried.

10. The method of claim 8 wherein fraction A is wet ground, the water used in wet grinding being from 2 to 10 times the weight of the coffee of fraction A.

11. The method of claim 10 wherein the extract collected from the fresh stage has an oil content of less than 1 percent of the solids content of the extract and is freeze dried.

* * * * *

UNITED STATES PATENT OFFICE
CERTIFICATE OF CORRECTION

Patent No. 3,655,399　　　　　Dated Apr. 11, 1972

Inventor(s) Esra Pitchon and Ernest L. Earle

It is certified that error appears in the above-identified patent and that said Letters Patent are hereby corrected as shown below:

In Column 2, Line 38 after "140°" and before "to" insert --F.--; Line 38 after "200°" and before "." insert --F--; Line 65 change "they" to --the--.

In Column 6, Line 19 (Claim 2, line 1) after "1" and before "which" insert --in--.

Signed and sealed this 5th day of September 1972.

(SEAL)
Attest:

EDWARD M. FLETCHER, JR.　　　　　ROBERT GOTTSCHALK
Attesting Officer　　　　　　　　　Commissioner of Patents